United States Patent [19]

Medlin

[11] Patent Number: 4,572,391

[45] Date of Patent: Feb. 25, 1986

[54] BRACKETS FOR MOUNTING PAIRS OF ELECTRICAL OUTLET BOXES

[76] Inventor: Lewis B. Medlin, P.O. Box 237, Blue Ridge, Va. 24064

[21] Appl. No.: 750,264

[22] Filed: Jul. 1, 1985

Related U.S. Application Data

[63] Continuation-in-part of Ser. No. 690,057, Jan. 9, 1985, Pat. No. 4,533,060.

[51] Int. Cl.$^4$ .............................................. H02G 3/08
[52] U.S. Cl. ...................................... 220/3.9; 220/3.3; 220/3.5; 220/3.6
[58] Field of Search ..................... 220/3.9, 3.3, 3.5, 3.6

[56] References Cited

U.S. PATENT DOCUMENTS

| | | | |
|---|---|---|---|
| 2,252,953 | 8/1941 | Walters | 220/3.9 |
| 3,448,952 | 6/1969 | Swanquist et al. | 220/3.5 X |
| 3,913,773 | 10/1975 | Copp et al. | 220/3.92 |
| 4,135,337 | 1/1979 | Medlin | 220/3.3 X |
| 4,399,922 | 8/1983 | Horsley | 220/3.6 |
| 4,408,695 | 10/1983 | Balkwill et al. | 220/3.3 |
| 4,483,453 | 11/1984 | Smolik | 220/3.3 X |
| 4,533,060 | 8/1985 | Medlin | 220/3.9 |

Primary Examiner—Steven M. Pollard
Attorney, Agent, or Firm—B. B. Olive

[57] ABSTRACT

An outlet box (the term "outlet box" is also intended to encompass a junction box) mounting bracket useful in pairs for mounting a pair of outlet boxes has slots to accept the shanks of outlet box mounting screws to eliminate the necessity of removing the screws when assembling the outlet box to one side of the bracket and a dry wall ring to the opposite side of the bracket. The bracket has an L-shape with right angled plate portions at one end, one of which plate portion is adapted to serve as a stiffening arm between the walls. At the opposite end, another flat plate portion is adapted to be secured to the front surface of a construction stud to another bracket in a piggyback array or to an extension plate in turn secured to a stud. A recessed plate portion between the ends of the bracket contains the mentioned slots around an opening which registers with the interior chamber of the box and brings the outer surface of a dry wall ring in the same plane as the front outermost plane of the bracket.

23 Claims, 32 Drawing Figures

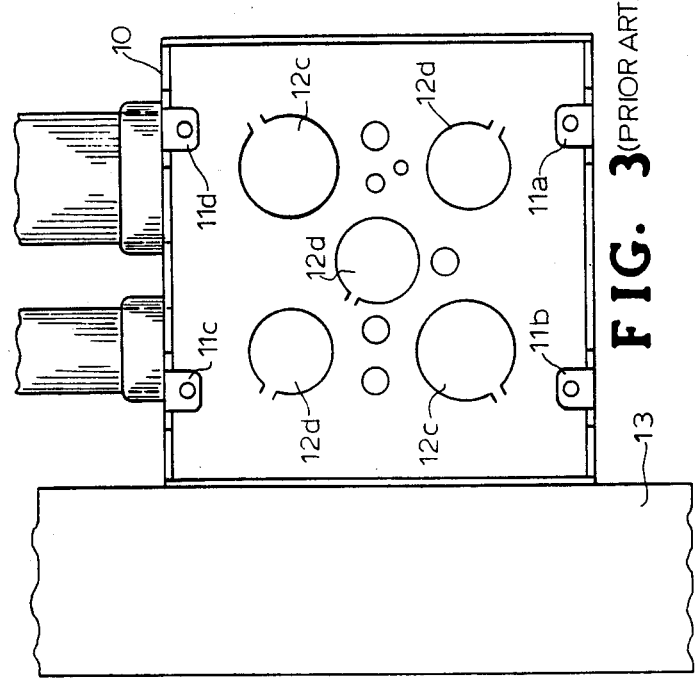
FIG. 3 (PRIOR ART)
FIG. 2 (PRIOR ART)
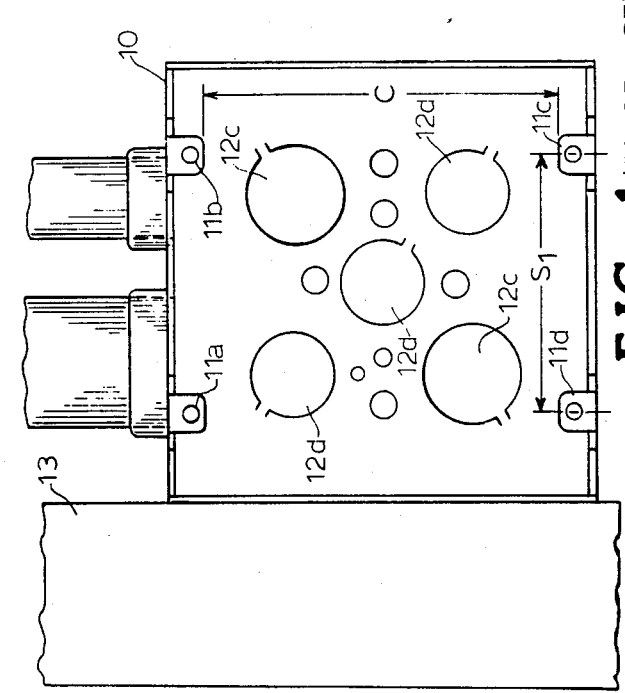
FIG. 1 (PRIOR ART)
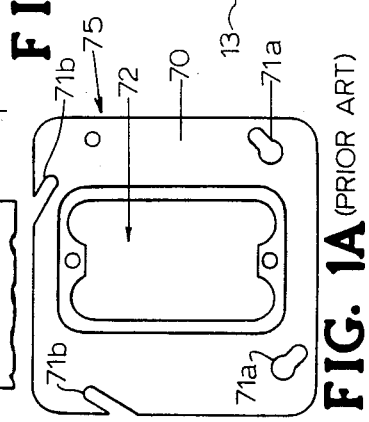
FIG. 1A (PRIOR ART)

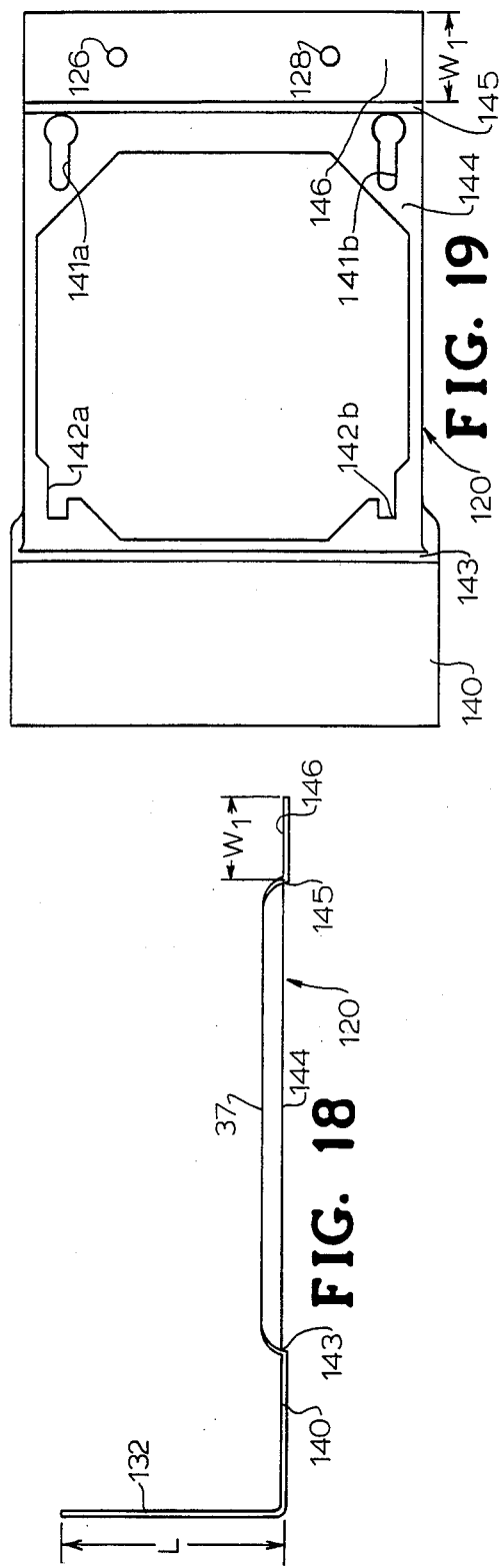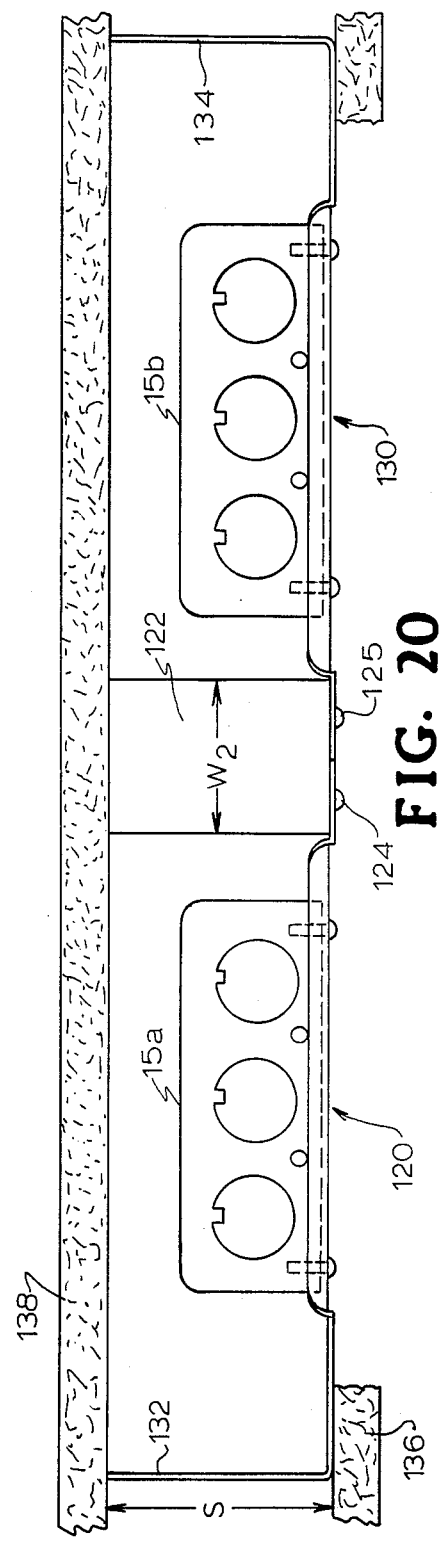

BRACKETS FOR MOUNTING PAIRS OF ELECTRICAL OUTLET BOXES

CROSS REFERENCE TO RELATED APPLICATIONS

This application is a continuation-in-part of prior patent application Ser. No. 690,057 entitled MOUNTING BRACKET FOR ELECTRICAL OUTLET BOXES, filed Jan. 9, 1985, now U.S. Pat. No. 4,533,060.

DESCRIPTION

1. Technical Field

The present invention relates to brackets for mounting of electrical equipment and more specifically for the mounting a plurality, typically a pair, of electrical outlet and junction boxes (hereafter referred to only as outlet boxes) on opposite sides of vertical metal studs, wooden studs, or the like, during building construction and/or repair.

2. Background Art

An object of the prior invention of copending application Ser. No. 690,057 was to improve on commonly used electrical outlet box mounting means shown in U.S. Pat. Nos. 4,135,337 and 4,399,922, particularly for mounting a single 4 11/16″ box for which there is presently no adequate bracket. The present invention, as an improvement over the prior invention, primarily seeks to reduce time and labor requirements for installation of pairs of electrical outlet boxes and while so doing provide a mounting bracket which affords a relatively wide range of adjustability for mounting a pair or more of either 4″ or 4 11/16″ size boxes.

The preferred method for installing a single outlet box is to mount the outlet box on a bracket secured to the stud rather than mounting the outlet box on the stud itself. In this preferred method, it is desirable to first install the bracket and then the outlet box. After these operations are completed and appropriate knock-out discs removed, it is desirable to next secure the pipe or cable, then pull the wire, make up the wirings, joints, and splices and finally secure the dry wall ring to the bracket and box. Experience on the job dictates the described procedure as being effective to save both time and expense.

The bracket described in applicant's prior art U.S. Pat. No. 4,135,337 provided a significant improvement over previously-available, box-mounting devices, particularly for mounting a single conventional four-inch square size outlet box. U.S. Pat. No. 4,135,337 also provided an improvement for mounting pairs of outlet boxes as seen in FIG. 6 of the patent. However, disadvantages existed which hampered the complete acceptance of the bracket of U.S. Pat. No. 4,135,337 when applied to the large 4 11/16 inch square size boxes, either singly or in pairs. For the larger size boxes, it was found necessary to remove all of the outlet box mounting screws in order to attach the box to its mounting bracket after the bracket had been attached to the stud. The necessity to remove the box mounting screws arose irrespective of how the outlet box screw tabs were oriented with respect to the bracket. Another disadvantage resided in the fact that the bracket allowed no horizontal or vertical adjustment of the mounting screws with respect to the bracket. As another aspect of the prior art, the bracket described in U.S. Pat. No. 4,135,337 provided an offset only on the side of the bracket attached to the stud so as to offset the dry wall ring and thus reduce bulging of the finished dry wall plaster. However, this single offset arrangement has not been found completely satisfactory and a need has arisen to improve the manner in which the dry wall ring is offset on the bracket when mounting either a single outlet box or a pair or more of outlet boxes so as to provide further improvements in the reduction of the bulging of the finished dry wall or plaster.

U.S. Pat. No. 4,399,922 attempted to overcome some of the inconveniences of applicant's U.S. Pat. No. 4,135,337 particularly as it applied to mounting single outlet boxes. However, the outlet mounting arrangement of U.S. Pat. No. 4,399,922 provided no vertical or horizontal adjustment of the outlet box in relation to the bracket and also required that the dry wall ring be attached before mounting the bracket. Thus, the working space within the outlet box becomes substantially restricted. U.S. Pat. No. 4,399,922 also teaches a flat surfaced bracket without offsets and which continues the problem of reducing bulging of the finished drywall or plaster. Also, U.S. Pat. No. 4,399,922 does not deal with mounting more than a single outlet box.

Of particular interest to the present invention is the need to further improve upon the bracket construction for mounting pairs of outlet boxes whether of the 4″ or 4 11/16″ size. The disadvantages of the bracket shown in FIG. 7 of U.S. Pat. No. 4,135,337 for mounting a pair of outlet boxes have been mentioned. Also to be noted is that U.S. Pat. No. 4,135,337 in FIG. 7 does not provide means for stiffening the cantilevered bracket arm on which each outlet box is mounted. While U.S. Pat. No. 4,399,922 does not teach means for mounting a pair of outlet boxes, it is recognized that U.S. Pat. No. 4,399,922 is useful in its teaching of use of a stiffening arm for a single outlet box which is also uniquely incorporated as a part of the present invention for mounting a plurality of boxes.

Copending application Ser. No. 690,057 provided an improved mounting bracket which could be sized to fit either a single standard large size box or a single standard small size box and typical non-standard dry wall rings. The improved mounting bracket allows a single outlet box to be attached to its mounting bracket without having to remove all of the mounting screws, provides both vertical and horizontal adjustment of the outlet box with respect to the bracket, allows a maximum opening for wiring operations prior to final assembly of the dry wall ring, does not require that the dry wall ring be assembled to the bracket before wiring the outlet box and finally provides improvements in the offset needed to eliminate bulging of the finished dry wall or plaster. The retention of these desirable single outlet box mounting features in an improved outlet mounting assembly for mounting two or more outlet boxes thus becomes the object of the present invention which along with other objects will become apparent as the description proceeds. The present invention also has as an object meeting a need in the industry for being able to mount outlet boxes in positions substantially offset from the stud position and also for being able to mount several outlet boxes side by side particularly when the studs are spaced substantially far apart such as on 24″ centers.

DISCLOSURE OF INVENTION

In accordance with the invention set forth in copending application Ser. No. 690,057 (hereinafter referred to as the "prior invention") and which is incorporated in the present invention, applicant provides a single thin sheet metal formed electrical outlet box mounting bracket primarily intended for mounting single standard large size boxes, i.e., 4 11/16 inch size boxes, having two screw tabs on each of two opposed side walls. The prior invention bracket provides for specially-arranged slots to alleviate the need when the outlet box tabs are horizontally oriented to remove screws before attaching the outlet box and/or dry wall ring and provides for installation of the outlet box to the bracket and stud facilitating the pulling of wire, making up of joints and installation of wiring devices inside the outlet box prior to attaching the dry wall ring. In the preferred embodiment of the prior invention at least four slots are positioned horizontally and four slots are positioned vertically to allow maximum versatility in positioning of the outlet box knock-out discs to accept conduit pipe or cable. The box-mounting portion of the prior invention bracket having the mentioned slots and opening is offset rearwardly from the face of the bracket so that when the bracket is mounted and the dry wall ring is positioned, there will be no bulging or breaking of the finished dry wall or plaster on either side. In second and third embodiments of the prior invention, there are provided only four vertical slots or only four horizontal slots. In the third embodiment of the prior invention, the bracket may be of reduced size with only four horizontal slots spaced for use with small size boxes, i.e., 4-inch square size, with only two diagonally-opposed screw tabs. A fourth embodiment of the prior invention adapts to stud or non-stud mounting.

With the disclosure of the prior invention in mind, the present invention provides a modified bracket particularly useful for use in pairs for mounting a pair of outlet boxes but also useful for mounting more than two boxes. The advantages and construction of the prior invention are retained. As with the prior invention, the improved bracket of the present invention is formed of a single sheet of thin sheet metal and is adapted for being formed for use as a set of brackets for mounting either a pair of standard large size boxes, i.e. 4 11/16" size boxes, or a pair of standard small size boxes, i.e. 4" size boxes. In other respects, the present invention preserves the slot and offset arrangements of the prior invention as previously explained. The present invention is also illustrated adapted to both piggyback and extension plate mounting arrangements where substantial offset from the stud is required.

BRIEF DESCRIPTION OF DRAWINGS

In the following drawing descriptions, FIGS. 1–17 repeat the descriptions of the prior invention described in copending application Ser. No. 690,057 and FIGS. 18–31 relate specifically to the present invention.

FIG. 1 is a front elevation view of a prior art four screw tab 4 11/16" electrical outlet box mounted to the side of a vertical stud with a large cable connected adjacent the stud and a small cable adjacent the larger cable connection and with the screw tabs vertically oriented.

FIG. 1A illustrates a representative prior art dry wall ring.

FIG. 2 is a top plan view of the prior art arrangement of FIG. 1 but with the cable connections removed to illustrate the large and small knock-out discs.

FIG. 3 is a front elevation view of the prior art electrical outlet box of FIG. 1 with the box rotated so that a small cable connection is adjacent the vertical stud to illustrate a typical wiring requirement.

FIG. 18 is a top plan view of a bracket according to a first embodiment of the present invention.

FIG. 19 is a front elevation view of the bracket of FIG. 18.

FIG. 20 is a top plan view of a pair of the FIGS. 18–19 brackets shown in abutting relation secured to a common stud and mounted between two partially illustrated walls and illustrated supporting a pair of small size outlet boxes.

BEST MODE FOR CARRYING OUT THE INVENTION

Figure 4:
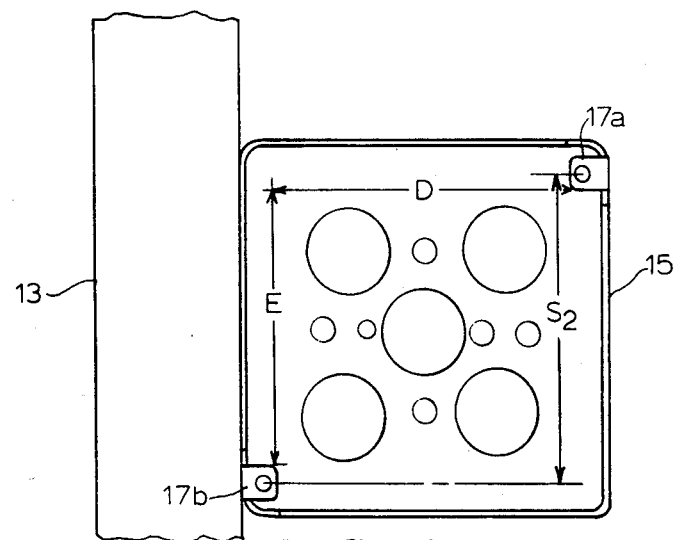
FIG. 4 is a front elevation view of a prior art two screw tab small, i.e., four inch size, electrical outlet box mounted to the side of a vertical stud.

The description will first describe various related prior art apparatus and practices in reference to FIGS. 1–6 to give background for the prior invention bracket described in reference to FIGS. 7–12 according to a first embodiment of the prior invention and in reference to FIGS. 13–17 in reference to second, third and fourth embodiments of the prior invention. The description will then refer to FIGS. 18–31 relating specifically to six embodiments of the present invention.

Referring initially to FIGS. 1 through 4 for background purposes, electrical outlet boxes 10 and 15 are typical of two types of boxes available on today's market and are illustrated installed according to prior art practice. The larger, i.e., standard square 4 11/16" size, box 10 of FIGS. 1 through 3 has four threaded tabs 11a, 11b, 11c and 11d which receive screws to hold a plaster/dry wall ring such as the illustrated ring 75 (FIG. 1A) having a thin flange 70, a central opening 72 and appropriate screw clearance holes or slots 71a, 71b. In the outside walls of box 10 are knock-out discs 12a, 12b, only two being shown. The knock-out discs are alternated such that a small or a large knock-out disc may be positioned adjacent the wall stud 13 according to construction requirements. FIGS. 1 and 3 illustrate how the large size box 10 may be rotated to position either a small or large knock-out disc adjacent stud 13. Box 10 is shown fastened to stud 13 by screws which pass through holes 14a, 14b into stud 13. Each wall of box 10 has a pair of holes 14a, 14b. This arrangement necessitates the fastening of box 10 to stud 13 prior to making wiring connections, etc. within box 10 whereas it would be desirable to fasten the box to the bracket only as in FIG. 5.

Figure 5:
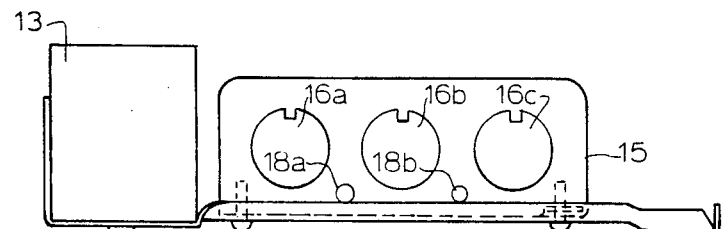
FIG. 5 is a top plan view of the small size box of FIG. 4 illustrating that the box has three equal size knock-out discs on each side for cable connections and illustrating a prior art outlet box mounting bracket of a type made and sold by applicant.

FIGS. 4 and 5 illustrate for further background the type of small size, i.e., 4" size, outlet box 15 which is adapted to receive numerous cable connections of like diameter around the periphery of the box 15. As seen in FIG. 5, the small size box 15 has three knock-out discs 16a, 16b and 16c situated in each of the sidewalls thereof. The conventional small size box 15 has two threaded tabs 17a, 17b located diagonally opposite each other. Each side has a pair of screw holes 18a, 18b which in the past have been used for connecting box 15 to stud 13.

Figure 6:
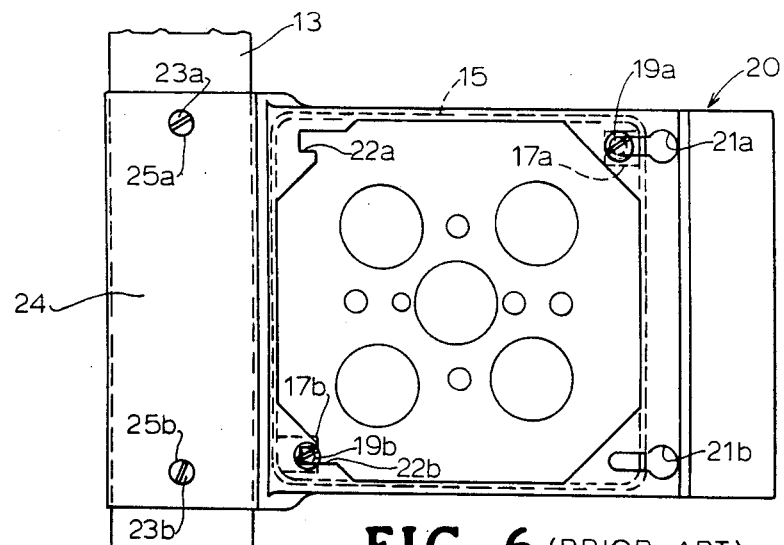
FIG. 6 is a front elevation view of the small size outlet box of FIGS. 4 and 5 installed in a prior art outlet box mounting bracket of a type presently manufactured and sold by applicant.

FIGS. 5 and 6 as further background illustrate in conjunction with the small size box 15 a small size outlet box mounting bracket 20 which applicant has previously manufactured and sold. Box 15 is mounted on bracket 20 by means of screws 19a, 19b which pass through slotted holes 21a, or 21b and slots 22a or 22b (see FIG. 6). Box 15 may be appropriately positioned and horizontally adjusted on bracket 20 by sliding to the left or right on screws 19a, 19b. The bracket 20 and box 15 unit is secured to stud 13 by screws 23a, 23b which pass through L-section 24 of bracket 20 by way of holes 25a, 25b. Bracket 20 provides an improved offset as compared to the bracket of U.S. Pat. No. 4,135,337, provides horizontal adjustability and allows the small size box to be installed with the mounting screws installed but lacks all of those features needed in practice for mounting a standard large size box or for mounting a pair of large or small size outlet boxes.

Reference is next made to FIGS. 7 through 12 which are illustrative of the electrical outlet box mounting bracket 30 of the prior invention according to a first embodiment of copending application Ser. No. 690,057. Bracket 30 primarily intended for mounting large size outlet boxes is preferably formed of a small section of sheet metal and is adapted to fit snugly against side and front surfaces of metal stud 13 and integrally secured thereto. Bracket 30 assumes an L-shape and comprises a flat arm 31 and at a right angle thereto a laterally extending flat web 32 which is an integral extension of arm 31. Arm 31 and web 32 are each provided with a pair of stud-mounting holes. Supporting member 32 is bounded by offset 33 and continues to extend laterally outward from arm 31 as flat-mounting member 34 bounded at its outer end by offset 35 from which extends laterally the flat end member 36 in the same plane as member 32. An inwardly-turned, right-angled, strengthening flange 37 surrounds members 34 and 36. Laterally-extending mounting member 34 is provided with a substantially-large, square-shape cutout or opening 40 with outwardly rounded corners 41 and which is just slightly smaller than the interior dimensions of the large size electrical outlet box 10. In a preferred embodiment, dimensions A and B (FIG. 7) are equal and are substantially equal to dimension C (FIG. 1), the tab clearance for the standard large size box.

Member 34 has two opposed pairs of open-ended, laterally-spaced, horizontally-extending slots 45a, 45b and 46a, 46b. Slots 45a, 45b are formed on straight left edge 45 and as viewed in FIG. 7 extend to the left whereas slots 46a, 46b form on straight right edge 46 and extend to the right. As seen from FIGS. 7, 9, 10 and 12, slots 46a, 46b are longer, preferably ½ inch, than slots 45a, 45b, preferably ¼ inch. This added length allows for both lateral or horizontal adjustment of box 10 on bracket 30 and also allows box 10 to be mounted on bracket 30 with all of the mounting screws in place when box 10 is oriented as in FIG. 2. In addition, member 34 has two opposed pairs of vertically-extending, open-ended slots 47a, 47b and 48a, 48b and of substantially equal length, preferably ¼ inch. Slot spacings $D_1$ and $D_2$ (FIG. 7) equal the tab screw spacing $S_1$ of FIG. 1. Slots 47a, 47b extend upward from straight top edge 47 whereas slots 48a, 48b extend downward from straight bottom edge 48 (see FIG. 7). All of the slots are sufficiently wide, preferably about ¼ inch, to provide loose clearance for the mounting screws the shanks of which are typically 3/16" size but sufficiently narrow to retain the screw heads. Thus, it is clear that bracket 30 offers a large unobstructed opening 40 and substantial horizontal and at least limited vertical adjustment thereof when used for mounting the typical large size outlet box 10 illustrated in FIGS. 1–3.

In use, bracket 30 is put into place with arm 31 abutting stud 13 on the side thereof and with web 32 abutting the face of stud 13. Web 32 has a pair of holes 32a, 32b through which appropriate mounting screws may be passed to secure bracket 30 to stud 13. Bracket 30 alternatively may be secured to stud 13 by holes 31a, 31b in arm 31 with appropriate screws fastening into stud 13. Either pair of holes may be used to fasten bracket 30 to metal stud 13 although it is not ordinarily necessary to use all four. After bracket 30 is mounted on stud 13, the large size outlet box 10 is mounted on bracket 30 with the screw tabs oriented vertically as in FIG. 10 or horizontally as in FIG. 12. One top screw 55 and one diagonally opposed bottom screw 56 are used to initially mount box 10 in place on bracket 30. Thus, screws 55, 56 loosely but securely hold box 10 attached to bracket 30 for further steps of installation.

Appropriate knock-out discs 12a, 12b or 12c, 12d may be selected and removed, either before or after outlet box 30 is installed on bracket 30. After box 30 is installed, wiring is pulled to the box and wiring connections, joints and splices are made therein. Lastly, although not shown, an appropriate size and type dry wall ring such as ring 75 (FIG. 1A) is secured to bracket 10. The selected conventional dry wall ring slides in place on two screws holding bracket 30 and box 10 in place and which can later be tightened to secure the dry wall ring on member 34 between offsets 33 and 35. Different manufacturers' different ring configurations and the use of two screws only to hold the box, bracket and ring together are readily accommodated by the invention bracket. Offset dimension T (FIGS. 8 and 11) is made substantially equal to the thickness of the dry wall ring flange 70 which minimizes bulging of the finished dry wall or plaster. Dimension $F_1$ of left surface 39 (FIG. 7) is sufficiently wide to accommodate varying widths of dry wall ring flanges. Dimension $F_2$ of right surface 38 is made sufficiently wide to permit a dry wall ring open or keyhole slot to rotate on one screw, e.g. screw 45b (FIG. 12), when another diagonally opposite dry wall ring open or keyhole slot is moved to engage another diagonally opposite screw, e.g., screw 46b (FIG. 12) and while permitting the dry wall flange to slide on surface 38.

Figure 10:
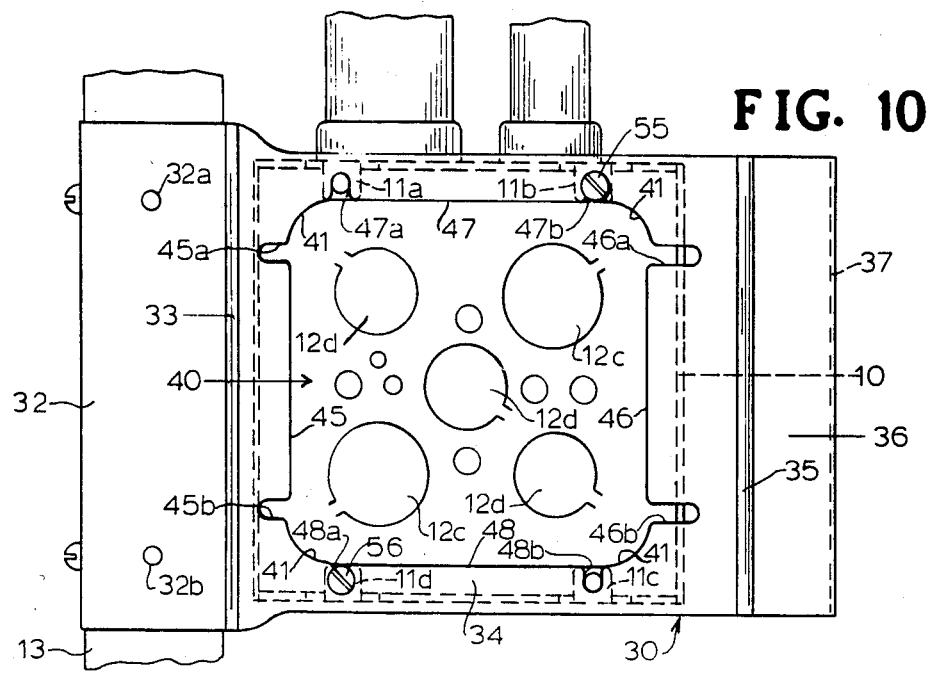
FIG. 10 is a front elevation view of the bracket of FIGS. 7–9 of the prior invention with the bracket mounted on a prior art large size, four-tab electrical outlet box.
Figure 11:
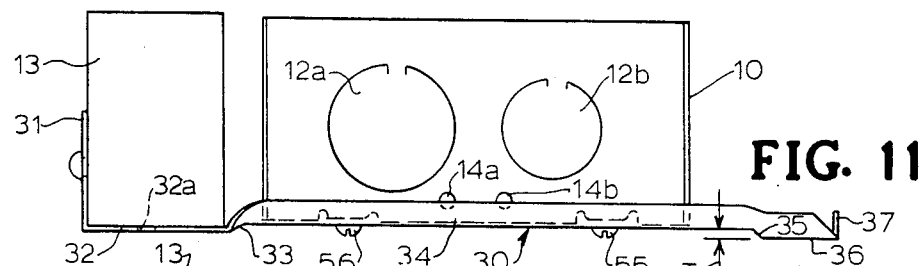
FIG. 11 is a top plan view of the bracket of FIG. 10 mounted on the outlet box of FIG. 10 with the cable connections removed.
Figure 12:
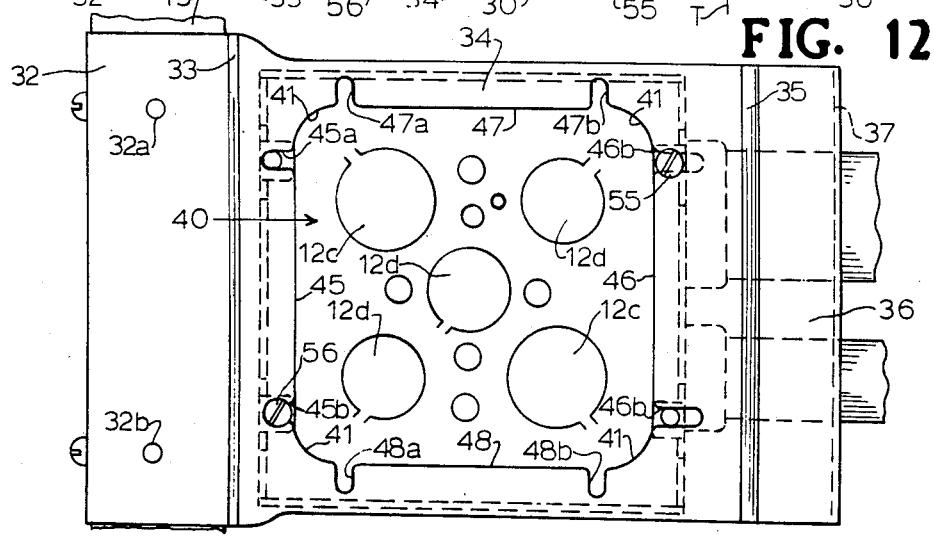
FIG. 12 is a front elevation view of the bracket of FIGS. 10 and 11 mounted on the large size outlet box of FIGS. 10 and 11 but with the outlet box rotated ninety degrees clockwise so that the cable connections are made from the side illustrating the adaptability of the prior invention bracket with various cable connection arrangements.

FIGS. 10 and 12 illustrate how outlet box 10 may be positioned either horizontally or vertically and in either orientation mounted on bracket 30. The FIG. 10 arrangement utilizes slots 47a, 47b and 48a, 48b whereas the FIG. 12 arrangement utilizes slots 45a, 45b and 46a, 46b.

When box 10 is oriented as in FIG. 10, only one or two mounting screws on the same sidewall can be secured in the respective screw tabs before box 10 is mounted. However, once the outlet box 10 is mated to the outlet box screw tabs as in FIG. 10, one or two mounting screws on both sidewalls can be installed and all wiring completed prior to installing the dry wall ring. In view of the gripping effect of ledge 47 on box 10, one tightly-secured mounting screw is normally sufficient for the initial wiring operation. When box 10 is oriented as in FIG. 12, either two or four mounting screws can be in place without preventing assembly of box 10 to bracket 30. Thus, with either orientation box 10 can be mounted with at least one mounting screw in place and in the case of the FIG. 12 orientation with two or more mounting screws in place.

The prior invention provides for having at least four horizontally oriented mounting slots or at least four vertically oriented mounting slots in the box mounting bracket. Preferably, a set of four horizontal as well as a set of four vertical mounting slots are provided as in FIGS. 7-12. In the second embodiment bracket 30' of FIG. 13 only the horizontal mounting slots are provided suited to the FIG. 12 box orientation and in the third embodiment bracket 30" of FIG. 14 only the vertical mounting slots are provided suited to the FIG. 10 orientation. In the described second and third embodiments of the prior invention there is preserved the advantages of a substantial unobstructed work opening 40 and adjustability either horizontally (FIG. 13) or vertically (FIG. 14) and also the advantage of being able to mount box 10 on the bracket with at least one mounting screw installed.

Figure 14:
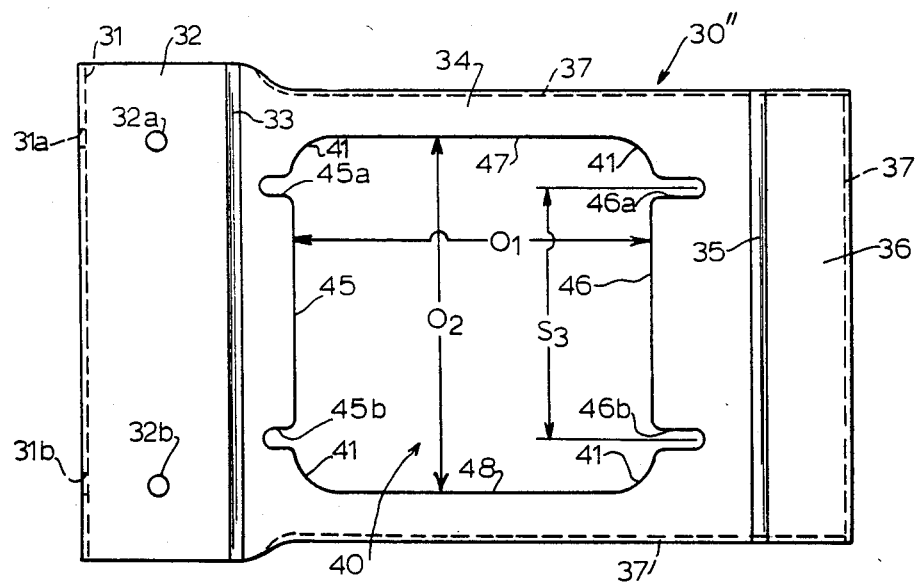
FIG. 14 illustrates a further modified bracket of the prior invention adaptable for either large or small size boxes.

When the spacing S-2 of FIG. 4 is made equal to the spacing S-3 of FIG. 14 and the opening dimensions 0-1 and 0-2 in FIG. 14 are made substantially equal to the dimensions D and E of FIG. 4 bracket 30" of FIG. 14 readily adapts to utility as a small box mounting bracket with all the advantages previously explained for the large mounting box of the prior invention.

Figure 7:
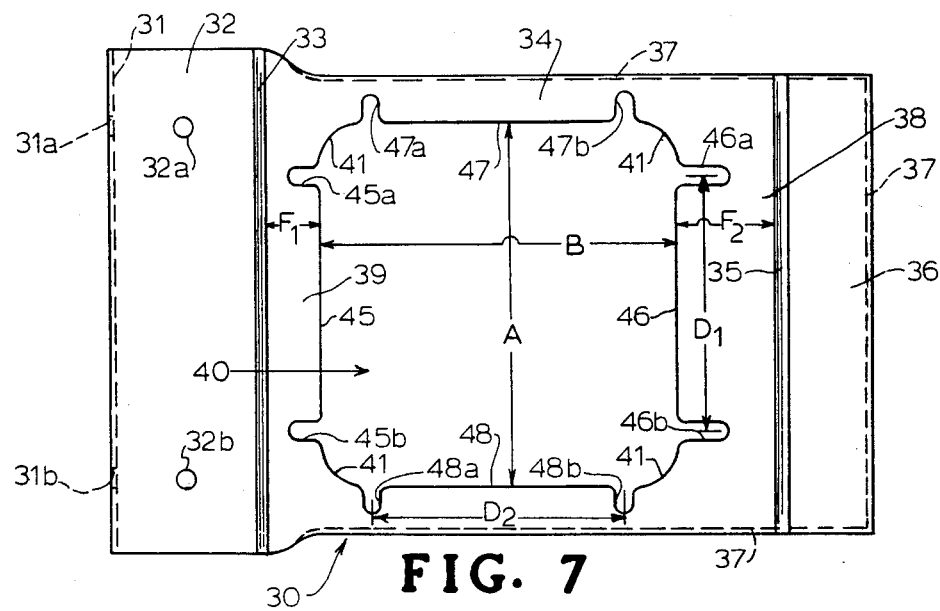
FIG. 7 is a front elevation view of the electrical outlet box mounting bracket of the prior invention for standard large size, i.e., 4 11/16", outlet boxes.
Figure 15:
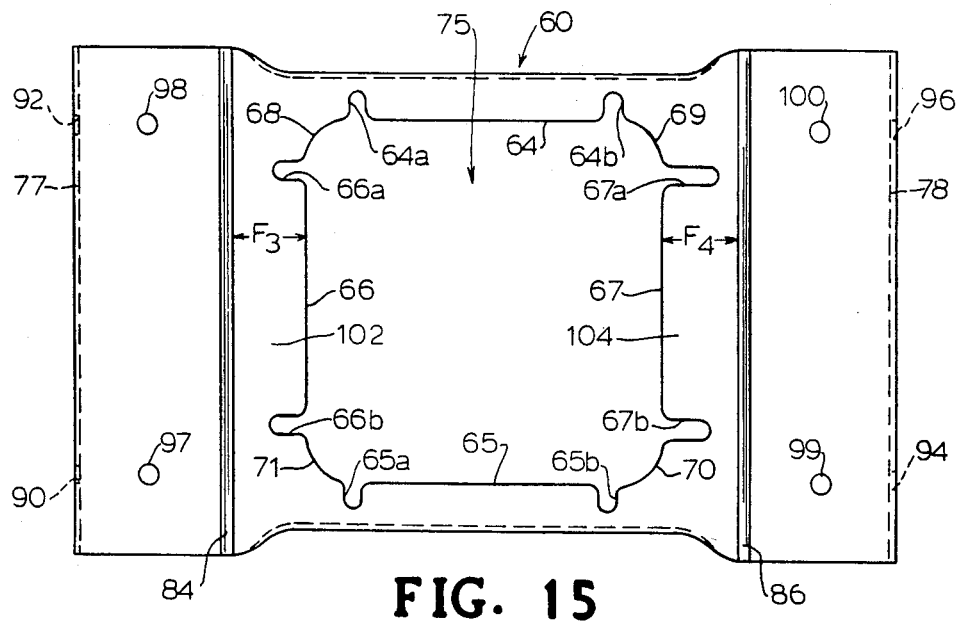
FIGS. 15, 16 and 17 represent respectively top plan, elevation and bottom plan views of a fourth embodiment of the prior invention adaptable for either stud or wall mounting.
Figure 16:
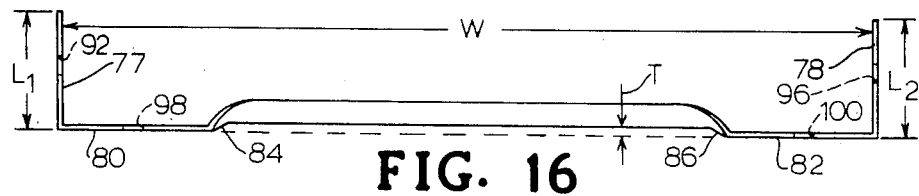
Figure 17:
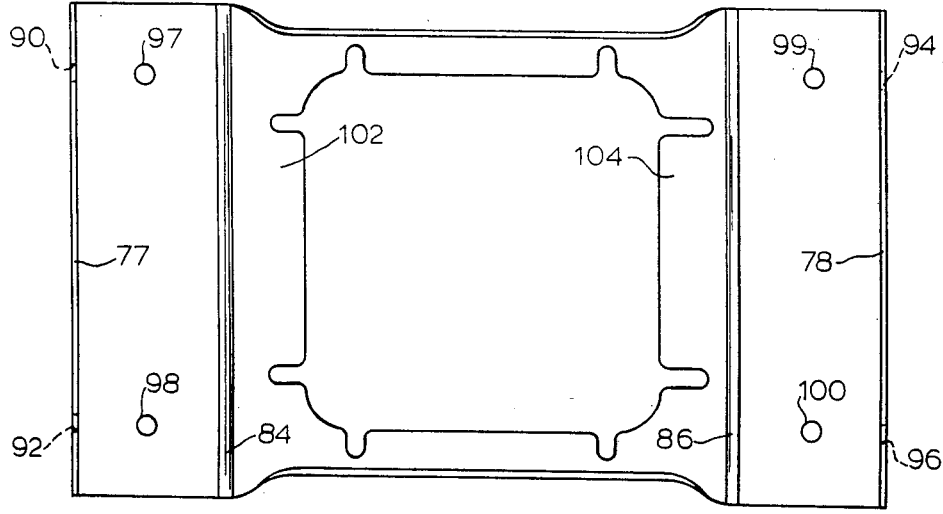

In a fourth embodiment of the prior invention illustrated in FIGS. 15-17, there is shown a modified bracket 60 suited to being attached to a single stud, to two closely-spaced studs or directly to the back of a wall such as a dry wall sheet. Bracket 60 is characterized by the same vertical and horizontal slot arrangement previously described in connection with the first embodiment of the prior invention illustrated in FIGS. 7-12. More specifically, bracket 60 is illustrated as having a pair of vertically-oriented slots 64a, 64b on upper straight edge 64, another pair of vertically-oriented slots 65a, 65b on bottom straight edge 65, a pair of horizontally-oriented slots 66a, 66b on left straight edge 66 and another pair of horizontally-oriented slots 67a, 67b on right straight edge 67. Outwardly curved corners 68-71 preserve the previously-discussed, relatively-large unobstructed opening 75 defined by the mentioned straight and curved edges. Bracket 60 has a pair of opposed flat arms 77, 78 joined to opposed flat web portions 80, 82 and opposed offsets 84, 86 on opposite sides of the flat plaster ring mounting surfaces surrounding opening 75. Bracket 60 is further characterized by having a pair of mounting holes 90, 92 in arm 77, mounting holes 94, 96 in arm 78, mounting holes 97, 98 in web 80 and mounting holes 99, 100 in web 82. Left surface 102 has a width $F_3$ equal to the width $F_4$ of right surface 104. Such widths are equivalent to the previously-mentioned width $F_2$ of right surface 38 (FIG. 7). Thus, bracket 60 is designed to allow the dry wall ring to slide on either left surface 102 or right surface 104 when the open or keyhole slot of a dry wall ring is rotating on one screw and a diagonally-opposite open or keyhole slot on the dry wall ring is being moved towards another diagonally-opposite screw. In an alternate construction, width $F_3$ (FIG. 15) may be made equal to width $F_1$ (FIG. 7).

Bracket 60 can be attached directly to the back of a wall such as the back of a dry wall sheet by screws attached to one or both of webs 80, 82. Alternatively, bracket 60 can be attached to a stud by using either one or both of arm 79 and web 80 or one or both of arm 78 and web 82. Additionally, for extremely secure mounting as, for example, in a vibration-sensitive application, the studs can be closely spaced to correspond to the width W of bracket 60 and securement made utilizing both arm 77 and web 80 as well as arm 78 and web 82. The lengths $L_1$, $L_2$ of the respective arms 77, 78 may be short for stud or wall mounting, may have one short for stud mounting and one long and equal to the wall interior space width for stiffening or both may be long and effective as stiffening arms. While a single bracket stiffening arm is known as in prior art U.S. Pat. No. 4,399,922 (FIGS. 6–8), the described bracket offers new advantages over such prior art.

Reference is next made to FIGS. 18–27 which are illustrative of the present invention primarily intended for mounting a pair of outlet boxes on a common stud in contrast to mounting a single outlet box on a stud or wall as previously explained in connection with FIGS. 1–17 of the prior invention. A first embodiment of the present invention is illustrated in FIGS. 18–20, a second embodiment in FIGS. 21–23, a third embodiment in FIGS. 24–26, a fourth embodiment in FIGS. 27–28, a fifth embodiment in FIG. 29 and a sixth embodiment in FIG. 30.

Making reference initially to FIGS. 18–20, bracket 120 when used in conjunction with a similar bracket 130 is primarily intended for mounting a pair of small size outlet boxes 15a, 15b by securing the respective brackets 120, 130 in abutting oppositely-oriented relation to a common stud 122 using a pair of fasteners 124, 125 installed in respective holes 126, 128 on each bracket. A stiffening arm 132 on bracket 120 and a comparable stiffening arm 134 on bracket 130 are formed with a length L to match the space between the respective front wall 136 and rear wall 138.

Bracket 120 assumes an L-shape and comprises the previously mentioned flat stiffening arm 132 and at a right angle thereto a laterally extending flat web 140 which is an integral extension of arm 132. Supporting web member 140 is bounded by offset 143 and continues to extend laterally outward from arm 132 as flat-mounting member 144 bounded at its outer end by offset 145 from which extends laterally the flat end member 146 in the same plane as member 132. End member 146 is formed with the previously mentioned holes 126, 128. The width $W_1$ of member 146 is substantially equal to one half the width $W_2$ of stud 122 to permit the abutting relation illustrated. An inwardly-turned right angled, strengthening flange 37 surrounds member 144. Laterally extending mounting member 144 is provided with slotted holes 141a, 141b and slots 142a and 142b comparable to the configuration previously illustrated in FIG. 6. Bracket 130 has the same construction as bracket 120 to provide the pair of brackets in FIG. 20.

Figure 8:
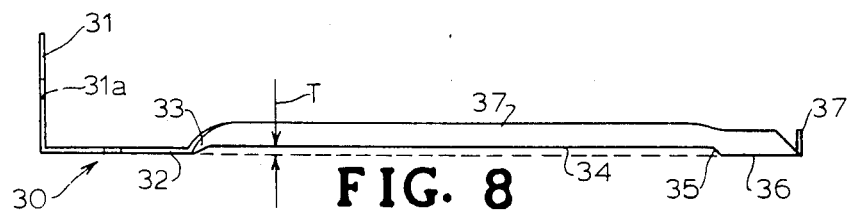
FIG. 8 is a top plan view of the bracket of FIG. 7.
Figure 9:
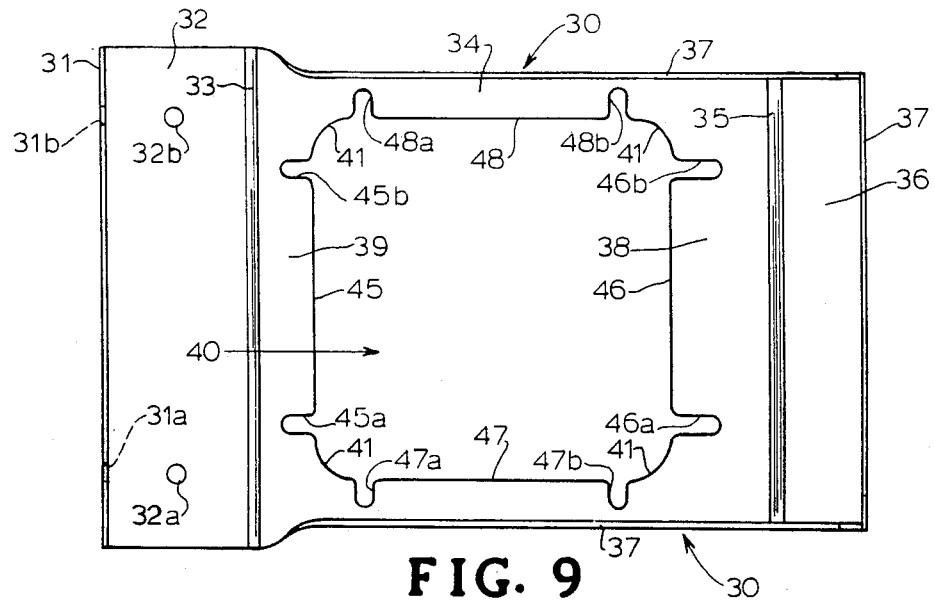
FIG. 9 is a rear elevation view of the bracket of FIGS. 7 and 8.
Figure 21:
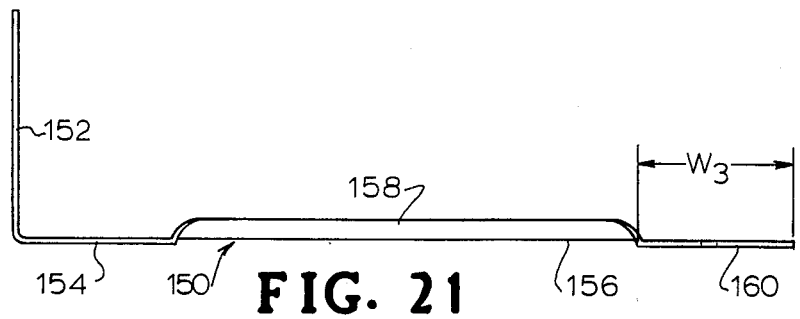
FIG. 21 is a top plan view of a bracket according to a second embodiment of the present invention.
Figure 22:
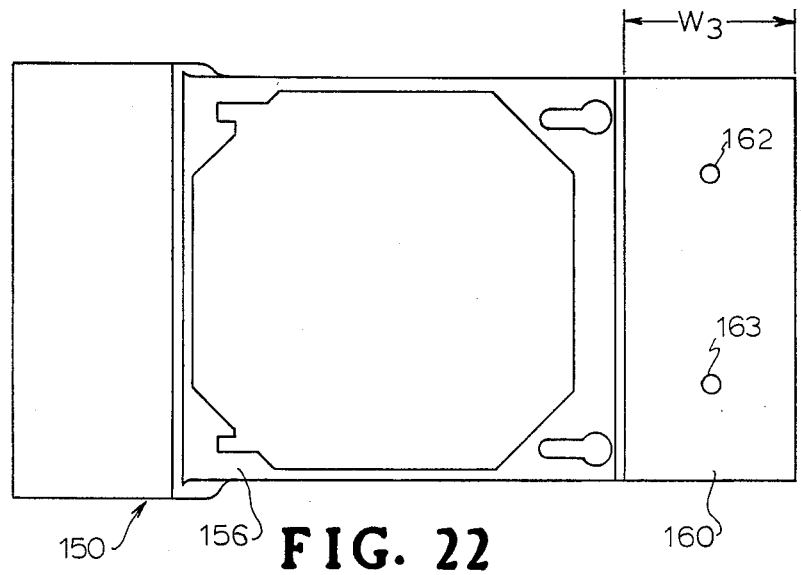
FIG. 22 is a front elevation view of the bracket of FIG. 21.
Figure 23:
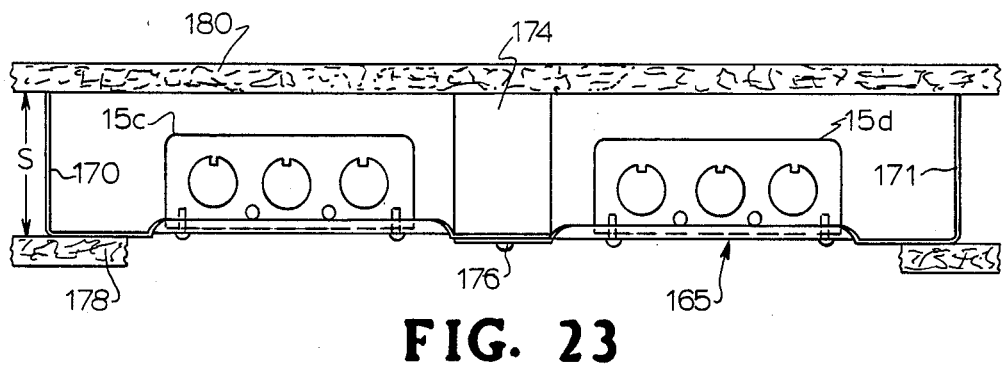
FIG. 23 is a top plan view of a pair of the FIGS. 21–22 brackets shown in overlapping relation secured to a common stud and mounted between two partially illustrated walls and illustrated supporting a pair of small size outlet boxes.

In a second embodiment of the present invention illustrated in FIG. 21–23, the improved bracket 150 uses the same slot and offset arrangement previously explained in connection with FIGS. 7–9. Bracket 150 includes a stiffening arm 152 appended to a web 154 from which extends a flat-mounting member 156 bounded by an inwardly turned, right angled strengthening flange 158. Flat end member 160 has a width $W_3$ substantially equal to the width $W_2$ of stud 179 and is formed with a pair of holes 162, 163. In use, as illustrated in FIG. 23 bracket 150 is used with a similar bracket 165 in an overlapping relation for supporting a pair of small size outlet boxes 15c, 15d on a common stud 174 utilizing a pair of fasteners 176. The respective stiffening arms 170, 171, as best illustrated in FIG. 23, extend between the illustrated front wall 178 and rear wall 180 mating the space.

Figure 24:
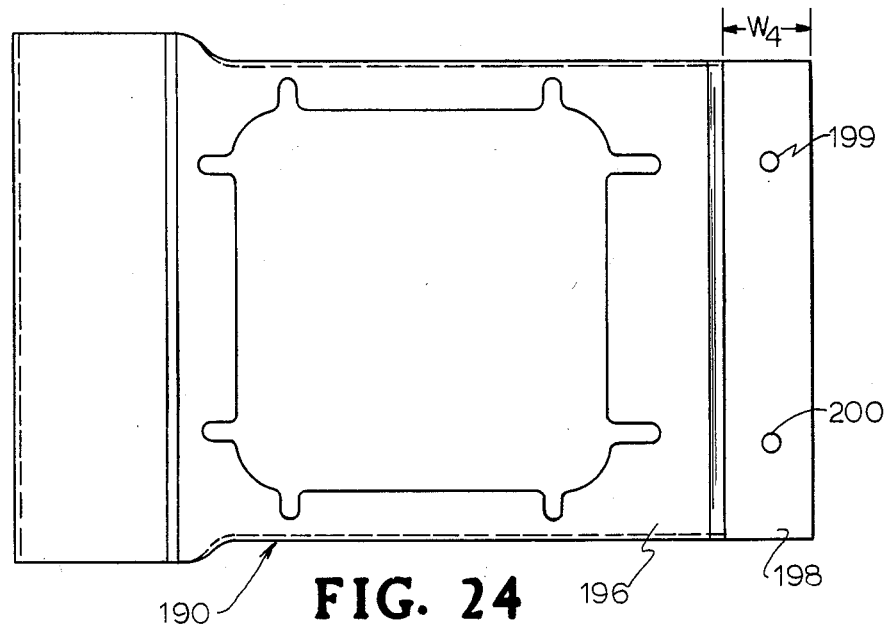
FIG. 24 is a front elevation view of a bracket according to a third embodiment of the present invention.
Figure 25:
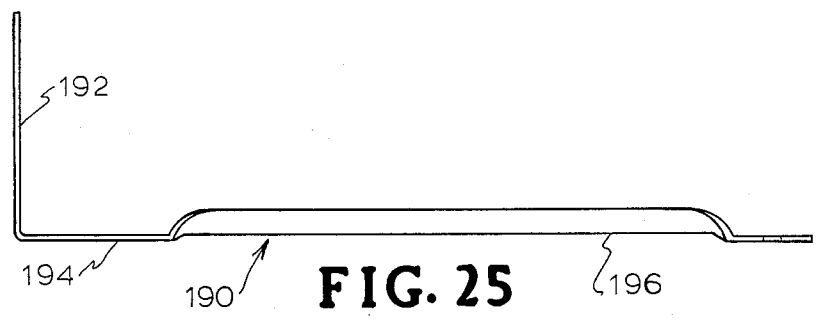
FIG. 25 is a top plan view of the bracket of FIG. 24.
Figure 26:
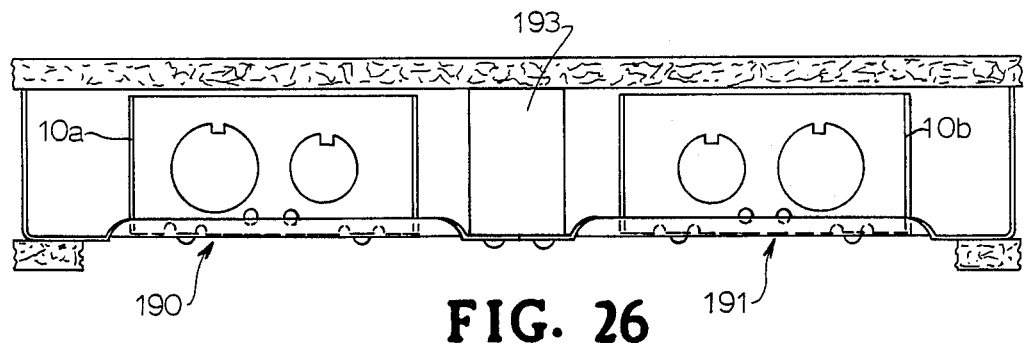
FIG. 26 is a top plan view of a pair of the FIGS. 24–25 brackets shown in abutting relation secured to a common stud and mounted between two partially-illustrated walls and illustrated supporting a pair of large size outlet boxes.

FIGS. 24–25 are referred to next as illustrating a third embodiment bracket 190 formed with a stiffening arm 192 extending from a web 194 which in turn is appended to a flat supporting arm 196 from which extends the end portion 198 having a pair of holes 199, 200. The width $W_4$ of the flat plate end portion 198 is made substantially equal to one half the width of the stud 193 to permit the abutting arrangement of FIG. 26. As will be understood from prior description, a pair of brackets 190, 191 of similar construction are used in abutting relation to support a pair of large size outlet boxes 10a, 10b on stud 193 in the manner previously explained with the slot and offset configuration of FIG. 24 being similar to that previously explained in connection with FIG. 13.

Figure 13:
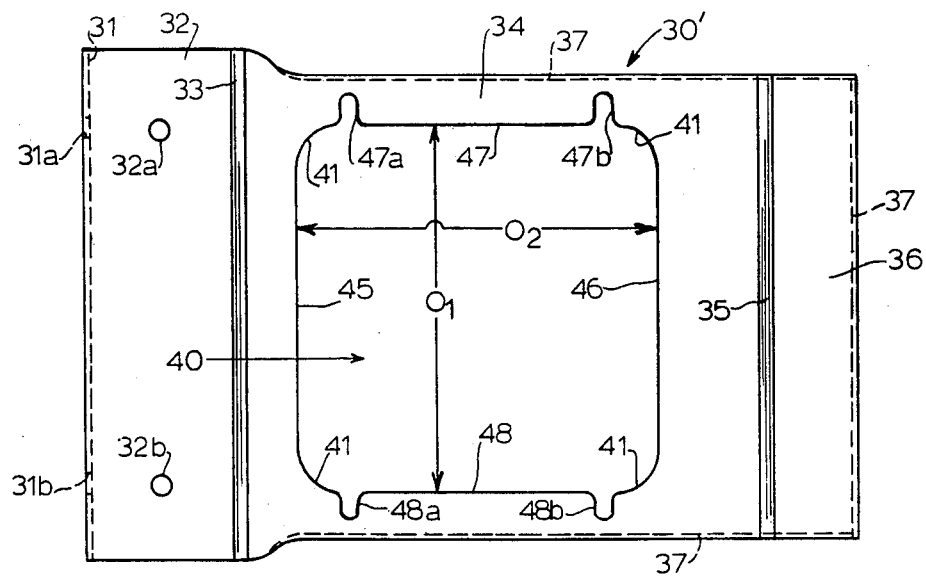
FIG. 13 illustrates a modified bracket of the prior invention adaptable for either large or small size boxes.
Figure 27:
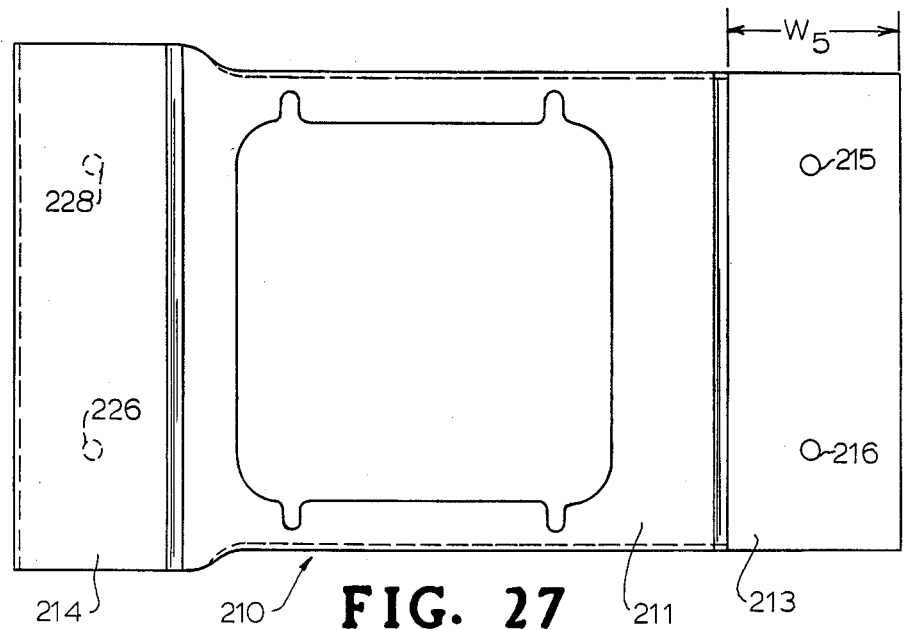
FIG. 27 is a front elevation view of a bracket according to a fourth embodiment of the present invention.
Figure 28:
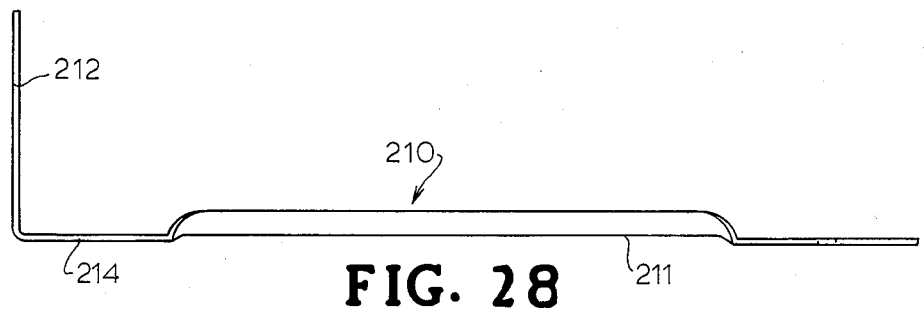
FIG. 28 is a top plan view of the bracket of FIG. 27.

Referring next to FIGS. 27–28, there is illustrated a fourth embodiment large box mounting bracket 210 having the slot and offset arrangement of FIG. 13, a stiffening arm 212, a web 214 appended to stiffening arm 212, a flat supporting arm 211, and an end portion 213. For this embodiment web 213 is assumed to have a width $W_5$ substantially equal to the width of the stud to facilitate the overlapping type mounting relation seen in FIG. 23. A pair of holes 215, 216 are provided for attaching to a common stud as previously explained. Bracket 210 thus when paired with a similar bracket permits mounting of a pair of large outlet boxes on a common stud with common fasteners 12 previously explained.

Figure 29:
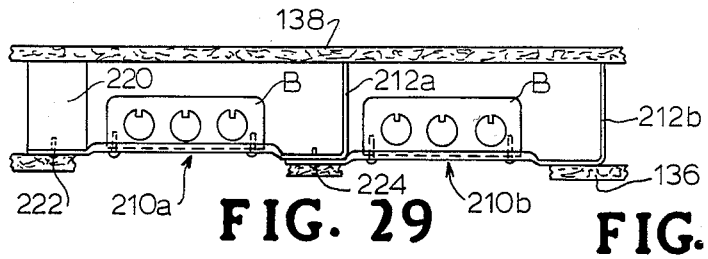
FIG. 29 is a top plan view, in reduced size, of a pair of the type brackets shown in FIGS. 27-28 secured to a single stud and mounted in a piggyback array.

Mention has been made that studs vary in their spacing and may for example be on 12", 16", 18" or 24" centers. It has also been mentioned that two or more outlet boxes may have to be substantially offset from the stud or there may be a need to mount several outlet boxes side by side between a pair of widely-spaced studs. FIG. 29 illustrates how the brackets of the present invention, using the type bracket 210 of FIGS. 27–28 as an example, can be mounted in a piggyback manner. More specifically, brackets 210a, 210b are illustrated in FIG. 29 with bracket 210a secured to stud 220 with fasteners 222. Bracket 210b is shown secured to bracket 210a with fasteners 222 passed through holes 226, 228 whose position is indicated in dashed lines in FIG. 27 for this optional piggyback arrangement. In this piggyback array, the respective stiffening arms 212a, 212b serve to stiffen both brackets between the front wall 136 and rear wall 138.

Figure 31:
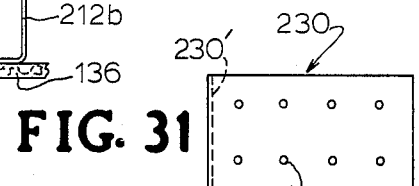
FIG. 31 is an elevation view of the extension plate shown in FIG. 30.
Figure 30:
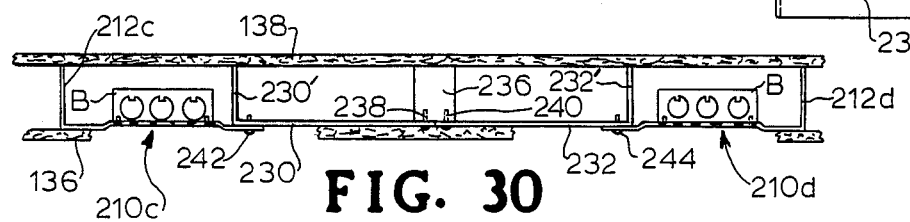
FIG. 30 is a top plan view, in reduced size, illustrating a pair of brackets of the type shown in FIGS. 27-28 secured to extension plates in turn secured to a stud.

In another embodiment illustrated in FIGS. 30–31, a pair of extension plates 230, 232 are each formed of a single sheet of rigid thin sheet metal having a plurality of uniformly-spaced holes 234. Extension plates 230, 232 are attached to a single stud 236 in abutting relation using fasteners 238, 240. Extension plates 230, 232 of approximate bracket size with respective right-angled stiffening arms 230', 232' at one end of each plate provide outwardly-extending stiffened platforms to which brackets 210c, 210d are attached utilizing fasteners 242, 244. As with the piggy-back arrangement illustrated in FIG. 29, the extension plate arrangement illustrated in FIG. 30 utilizing the respective stiffening arms 212c, 212d provides substantially rigid support for the pair of outlet boxes B once installed on the respective brackets 210c, 210d. By having a number of pairs of holes as illustrated in FIG. 31, the extension plates can be used either in the abutting relation illustrated in FIG. 30 or in an overlapping relation as required to obtain the particular desired location of the respective brackets 210c, 210d.

In summary, it can be seen that the unique combination of slots, offsets, web, arm and mounting surfaces of the prior invention bracket for mounting single outlet boxes have been preserved in the improved bracket of the present invention incorporating a stiffening arm and flat mounting web adapted for mounting a plurality, typically a pair, of outlet boxes on a common stud. In a single mounting system the following job-proven and practical advantages for mounting two or more of the standard 4 11/16 inch size square large outlet boxes are preserved while as also mentioned below also preserving essentially the same advantages for mounting two or more of the small size outlet boxes:

1. Allows each of a plurality of outlet boxes to be oriented in any position by 90° turns so as to get the knock-outs positioned wherever required for the job with one outlet box of the pair being oriented differently from the other outlet box of the pair.

2. Enables the plaster ring to be installed after all of the wiring within each outlet box has been completed.

3. Allows two or more of the standard large size outlet boxes to be mounted with plaster rings made by different manufacturers and requiring different screws to be used when mounting the plaster ring onto the bracket.

4. Enables each of plural outlet boxes being mounted to be captured in any orientation so as to prevent the outlet box falling off the bracket during wiring operations either within or leading to the outlet box.

5. During mounting of the pair of plural boxes enables for each box an open or keyhole slot of the plaster ring to rotate on one screw while a diagonally-opposite open or keyhole slot is positioned to engage a diagonally-opposite screw and while the plaster ring flange slides on a bracket surface between the offsets and on one side of the opening.

6. Provides a maximum size opening within the bracket particularly as to FIGS. 24–31 defined by interconnected straight, curved and slot edges thereby minimizing wire snagging and providing opportunity for wiring operations to be completed within each of the pair of outlet boxes even when the electrician is wearing gloves as, for example, in cold weather or rough working conditions.

7. Utilizing the horizontally-oriented slots allows each of a plurality of outlet boxes to be installed using a pair of diagonally-opposite screws loosely installed in the outlet box before the outlet box is mounted on the bracket and each outlet box to be wired even when the electrician is wearing gloves without running the risk of either outlet box falling off the bracket.

8. Utilizing the vertically-oriented slots also allows each outlet box to be held on the bracket by a pair of diagonally-opposite loosely installed screws and wired by the electrician wearing gloves without running the risk of the outlet box falling off the bracket.

9. Since plaster rings unlike outlet boxes are not standardized, accommodates to a wide range of plaster ring constructions of different flange width, different keyhole and open slot or part keyhole and part open slot arrangements and different requirements of where the tab screws have to be located for mounting purposes.

10. Provides offsets on both sides of each bracket used to mount the plurality of outlet boxes and thus the most desirable form of offset to minimize bulging of the drywall or plaster surface on opposite sides of the stud.

11. Enables wiring to be completed with each of the plurality of outlet boxes and brackets loosely assembled before installing the drywall ring.

12. Adapts a pair of brackets to being secured to a common stud for mounting a pair of outlet boxes.

13. Allows each outlet box of a pair of outlet boxes being mounted to be adjusted with respect to the bracket when either the vertically oriented or horizontally oriented slots are being used.

14. While particularly useful for mounting a pair of standard 4 11/16 inch size large outlet boxes, retains essentially all of the above listed advantages when the present invention bracket, in a reduced size, is utilized for mounting a pair of the standard 4-inch size small outlet boxes.

15. For manufacturing purposes minimizes the cost of tooling, permits each of a pair of brackets to be formed of a single, thin, rigid sheet of metal with an easily-formed, substantially-large opening defined, particularly in the case of FIGS. 24–28, by the edges of the rounded corners, and upper, lower, right and left straight edges.

16. With particular regard for the embodiments of the present invention brackets illustrated in FIGS. 21–31 the invention bracket eliminates the need for keyhole-type slots, eliminates straight edges at the corners of the opening and instead provides curved corner edges, and provides a slot arrangement in which all of the open slots extend outwardly from the opening, with the axis of each slot being oriented perpendicular to the straight edge of the opening from which the slot extends.

17. Recognizing that the term "outlet box" has been used throughout the description and is hereafter used in the claims to refer to both what are conventionally called "outlet boxes" as well as to what are conventionally called "junction boxes", the bracket of the present invention affords all of the previously set forth advantages either for mounting a pair of the type boxes used at the end use or for mounting a pair of the type boxes used with no attached wiring device.

18. Readily adapts to both piggyback and extension plate mounting.

19. In all of the illustrated embodiments there is provided an improved bracket particularly useful in pairs for mounting a pair of outlet boxes and having at least the following features:

(a) offsets on both sides of the opening;

(b) except for the bracket of FIGS. 18–23, at least four slots leading outwardly from the opening and oriented in a common vertical or horizontal direction;

(c) a flat mounting web surface on one side of the opening adapted to stud piggyback, or extension plate mounting;

(d) a stiffening arm extending rearwardly and perpendicular to the front web surfaces;

(e) right and left flange ring mounting surfaces on opposite sides and adjacent to the opening at least one of which is sufficiently wide to permit a flange ring open or keyhole slot to pivot on one mounting screw and slide on the bracket while a diagonally-opposite flange ring open or keyhole slot is moved to engage a diagonally-opposite mounting screw; and (f) except only for the invention brackets of FIGS. 18–23 provides an opening defined by straight right, left, top and bottom edges and outwardly-curved corners and which is substantially the same size as the outlet box opening.

(g) a flat mounting web surface on one side of the opening of selected half or full stud width to permit selected abutted or overlapping mounting.

20. The ability to mount boxes of different sizes in close proximity is enhanced.

I claim:

1. A plural electrical outlet box mounting assembly, comprising:

(a) a pair of square outlet boxes each having integrally joined base and sidewalls formed with a selected number and size of knock-out discs and on the outer edge of each sidewall of one opposed pair of said sidewalls having a pair of inwardly-directed, laterally-spaced screw receiving tabs with threaded holes and overlying an interior chamber formed by said box with the pair of tabs on one said sidewall opposing and being laterally spaced apart the same distance as the pair of tabs on the opposite said sidewall;

(b) a pair of dry wall rings each having a central opening and a peripheral plate flange with screw clearance openings arranged for being mated to said tab threaded holes;

(c) a pair of mounting brackets, each said bracket comprising an L-shaped unitary mounting bracket formed of a single piece of stiff sheet material, including for each said bracket:

(i) first and second contiguous rectangular plate portions in right angular relation at a first end of said bracket, said first plate portion being sufficiently wide to substantially equal the width of the interior space of the wall on which said bracket is installed to thereby serve as a stiffening member for said bracket; and (ii) a plate body portion extending outwardly from said second plate portion having:

(aa) at an outer end a third rectangular flat plate end portion in the same plane as the plane of said second plate portion, said third plate end portion being adapted for securement to a selected support such as the front surface of a construction stud, the second plate portion of another bracket in piggyback relation, or one end surface of an extension plate and having a pair of holes formed therein for receiving a mating pair of fasteners to effect said securement;

(bb) between said third plate portion and second plate portion having a fourth rectangular plate portion in a plane offset from and substantially parallel to the plane of said second and third plate portions by an amount substantially equal to the thickness of a said dry wall ring flange, said fourth plate portion plane being established by parallel offsets formed on both sides of said fourth plate portion;

(cc) a substantially square opening in said fourth plate portion defined by opposed straight parallel upper and lower and opposed straight parallel right and left side edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;

(dd) a first pair of laterally spaced screw slots extending from the said upper edge of said fourth plate portion opening, said slot lateral spacing being equal to the lateral spacing between the threaded holes in each of said pair of tabs;

(ee) a second pair of laterally spaced screw slots extending from the said lower edge of said fourth plate portion opening, said second pair of slots having a depth compared to the depth of said first pair of slots sufficient for at least limited vertical box mounting adjustment on said bracket and being positioned opposite to said first pair of slots, said lateral spacing between said second pair of slots also being equal to the lateral spacing between the threaded holes in each of said pair of tabs;

(ff) a third pair of laterally spaced screw slots extending from the left edge of said fourth plate portion opening and having a lateral spacing substantially equal to the lateral spacing of said first and second pair of slots;

(gg) a fourth pair of laterally spaced screw slots extending from the right edge of said fourth plate portion opening, said fourth pair of slots being positioned opposite to the position of said third pair of slots and having a lateral spacing equal thereto and a depth compared to the depth of said first, second and third pair of slots enabling horizontal box mounting adjustment on said bracket;

(hh) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and (ii) between each pair of slots at the corners of said opening an outwardly curved edge serving as a continuation of the slot edge on either side thereof; and (d) a plurality of screws adapted for being loosely fitted in said slots and for being secured in said tab threaded holes, whereby when a pair of said brackets extending in opposite directions have the third plate portions thereof secured to the front surface of a construction stud or when a first one of said brackets has the third plate portion thereof secured to the front surface of a construction stud and the second one of said brackets has its third plate portion secured in a piggyback orientation to the second plate portion of the first one of said brackets or when selected said brackets have the third plate portion thereof secured to one end of an extension plate in turn secured to the front surface of a construction stud and fasteners are installed to perfect the securement and an electric outlet box is positioned adjacent the inner side of each said fourth plate portion of each said bracket in position with respect thereto so that the interior of each said respective electric outlet box is accessible through the respective said fourth plate portion opening adjacent thereto and a dry wall ring is fixed to the other side of said fourth plate portion, said first plate portions tend to stiffen said brackets and said slots enable each said outlet box, bracket and dry wall ring to be held in operative position with screws passed through said slots and secured in said tab-threaded holes with said tabs being oriented to mate with selected edges surrounding the respective said opening adjacent the respective said box and whereby the outer surface of the flange of each said ring is maintained when said screws are tightened in substantially the same plane as the outer surface of the respective said second and third plate portions of the respective said brackets on which each respective said ring is mounted.

2. A plural electrical outlet box mounting assembly as claimed in claim 1 wherein the width of each said respective third plate portion is substantially equal to the width of the stud surface to which said third plate portions are secured thereby enabling the use of common fasteners therethrough with said third plate portions in overlapping relation and said pair of brackets extending in opposite direction.

3. A plural electrical outlet box mounting assembly as claimed in claim 1 wherein the width of each said respective third plate portion is substantially equal to one-half the width of the stud surface to which said third plate portions are secured thereby enabling said third plate portions to be secured in abutting relation with said pair of brackets extending in opposite directions.

4. A plural electrical outlet box mounting assembly as claimed in claim 1 wherein at least one said bracket has the second plate portion thereof formed with a pair of holes for receiving fasteners securing the third plate portion of another said bracket thereto in piggyback relation.

5. A plural electrical outlet box mounting assembly as claimed in claim 1 including at least one rectangular extension plate formed of a single piece of flat stiff sheet material with a stiffening arm at one end in right angular relation and having a plurality of sets of pairs of holes spaced lengthwise thereof located and adapted for receiving fasteners to secure said plate to either the front surface of a said stud or to a respective said bracket third plate portion.

6. A plural electrical outlet box mounting assembly as claimed in claim 1 wherein each said bracket is formed of sheet metal and includes inwardly turned stiffening edges surrounding the fourth plate portion thereof.

7. A plural electrical outlet box mounting assembly, comprising:
(a) a pair of square outlet boxes each having integrally joined base and sidewalls formed with a selected number and size of knock-out discs and on the outer edge of each sidewall of one opposed pair of said sidewalls having a pair of inwardly-directed, laterally-spaced screw receiving tabs with threaded holes and overlying an interior chamber formed by said box with the pair of tabs on one said sidewall opposing and being laterally spaced apart the same distance as the pair of tabs on the opposite said sidewall;
(b) a pair of dry wall rings each having a central opening and a peripheral plate flange with screw clearance openings arranged for being mated to said tab threaded holes;
(c) a pair of mounting brackets, each said bracket comprising an L-shaped unitary mounting bracket formed of a single piece of stiff sheet material, including for each said bracket:
  (i) first and second contiguous rectangular plate portions in right angular relation at a first end of said bracket, said first plate portion being sufficiently wide to substantially equal the width of the interior space of the wall on which said bracket is installed to thereby serve as a stiffening member for said bracket; and
  (ii) a plate body portion extending outwardly from said second plate portion having:
    (aa) at an outer end a third rectangular flat plate end portion in the same plane as the plane of said second plate portion, said third plate end portion being adapted for securement to a selected support such as the front surface of a construction stud, the second plate portion of another bracket in piggyback relation, or one end surface of an extension plate and having a pair of holes formed therein for receiving a mating pair of fasteners to effect said securement;
    (bb) between said third plate portion and second plate portion having a fourth rectangular plate portion in a plane offset from and substantially parallel to the plane of said second and third plate portions by an amount substantially equal to the thickness of a said dry wall ring flange, said fourth plate portion plane being established by parallel offsets formed on both sides of said fourth plate portion;
    (cc) a substantially square opening in said fourth plate portion defined by opposed straight parallel upper and lower and opposed straight parallel right and left side edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;
    (dd) a first pair of laterally spaced screw slots extending from the said upper edge of said fourth plate portion opening, said slot lateral spacing being equal to the lateral spacing between the threaded holes in each of said pair of tabs;
    (ee) a second pair of laterally spaced screw slots extending from the said lower edge of said fourth plate portion opening, said second pair of slots having a depth compared to the depth of said first pair of slots sufficient for at least limited vertical box mounting adjustment on said bracket and being positioned opposite to said first pair of slots and having a lateral spacing equal thereto;
    (ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and (d) a plurality of screws adapted for being loosely fitted in said slots and for being secured in said tab threaded holes, whereby when a pair of said brackets extending in opposite directions have the third plate portions thereof secured to the front surface of a construction stud or when a first one of said brackets has the third plate portion thereof secured to the front surface of a construction stud and the second one of said brackets has its third plate portion secured in a piggyback orientation to the second plate portion of the first one of said brackets or when selected said brackets have the third plate portion thereof secured to one end of an extension plate in turn secured to the front surface of a construction stud and fasteners are installed to perfect the securement and an electric outlet box is positioned adjacent the inner side of each said fourth plate portion of each said bracket in position with respect thereto so that the interior of each said respective electric outlet box is accessible through the respective said fourth plate portion opening adjacent thereto and a dry wall ring is fixed to the other side of said fourth plate portion, said first plate portions tend to stiffen said brackets and said slots enable each said outlet box, bracket and dry wall ring to be held in operative position with screws passed through said slots and secured in said tab-threaded holes with said tabs being oriented to mate with selected edges surrounding the respective said opening adjacent the respective said box and whereby the outer surface of the flange of each said ring is maintained when said screws are tightened in substantially the same plane as the outer surface of the respective said second and third plate portions of the respective said brackets on which each respective said ring is mounted.

8. A plural electrical outlet box mounting assembly as claimed in claim 7 wherein the width of each said respective third plate portion is substantially equal to the width of the stud surface to which said third plate portions are secured thereby enabling the use of common fasteners therethrough with said third plate portions in overlapping relation and said pair of brackets extending in opposite direction.

9. A plural electrical outlet box mounting assembly as claimed in claim 7 wherein the width of each said respective third plate portion is substantially equal to one-half the width of the stud surface to which said third plate portions are secured thereby enabling said third plate portions to be secured in abutting relation with said pair of brackets extending in opposite directions.

10. A plural electrical outlet box mounting assembly as claimed in claim 7 wherein at least one said bracket has the second plate portion thereof formed with a pair of holes for receiving fasteners securing the third plate portion of another said bracket thereto in piggyback relation.

11. A plural electrical outlet box mounting assembly as claimed in claim 7 including at least one rectangular extension plate formed of a single piece of flat stiff sheet material with a stiffening arm at one end in right angular relation and having a plurality of sets of pairs of holes spaced lengthwise thereof located and adapted for receiving fasteners to secure said plate to either the front surface of a said stud or to a respective said bracket third plate portion.

12. A plural electrical outlet box mounting assembly, comprising:

(a) a pair of square outlet boxes each having integrally joined base and sidewalls formed with a selected number and size of knock-out discs and on the outer edge of each sidewall of one opposed pair of said sidewalls having a pair of inwardly-directed, laterally-spaced screw receiving tabs with threaded holes and overlying an interior chamber formed by said box with the pair of tabs on one said sidewall opposing and being laterally spaced apart the same distance as the pair of tabs on the opposite said sidewall;

(b) a pair of dry wall rings each having a central opening and a peripheral plate flange with screw clearance openings arranged for being mated to said tab threaded holes;

(c) a pair of mounting brackets, each said bracket comprising an L-shaped unitary mounting bracket formed of a single piece of stiff sheet material, including for each said bracket:

(i) first and second contiguous rectangular plate portions in right angular relation at a first end of said bracket, said first plate portion being sufficiently wide to substantially equal the width of the interior space of the wall on which said bracket is installed to thereby serve as a stiffening member for said bracket; and (ii) a plate body portion extending outwardly from said second plate portion having:

(aa) at an outer end a third rectangular flat plate end portion in the same plane as the plane of said second plate portion, said third plate end portion being adapted for securement to a selected support such as the front surface of a construction stud, the second plate portion of another bracket in piggyback relation, or one end surface of an extension plate and having a pair of holes formed therein for receiving a mating pair of fasteners to effect said securement;

(bb) between said third plate portion and second plate portion having a fourth rectangular plate portion in a plane offset from and substantially parallel to the plane of said second and third plate portions by an amount substantially equal to the thickness of a said dry wall ring flange, said fourth plate portion plane being established by parallel offsets formed on both sides of said fourth plate portion;

(cc) a substantially square opening in said fourth plate portion defined by opposed straight parallel upper and lower and opposed straight parallel right and left side edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;

(dd) a first pair of laterally spaced screw slots extending from the left edge of said fourth plate portion opening and having a lateral spacing substantially equal to the lateral spacing between the threaded holes in each of said pair of tabs;

(ee) a second pair of laterally spaced screw slots extending from the right edge of said fourth plate portion opening, said second pair of slots being positioned opposite to the position of said first pair of slots and having a lateral spacing equal thereto and a depth compared to the depth of said first pair of slots enabling horizontal box mounting adjustment on said bracket;

(ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and (d) a plurality of screws adapted for being loosely fitted in said slots and for being secured in said tab threaded holes, whereby when a pair of said brackets extending in opposite directions have the third plate portions thereof secured to the front surface of a construction stud or when a first one of said brackets has the third plate portion thereof secured to the front surface of a construction stud and the second one of said brackets has its third plate portion secured in a piggyback orientation to the second plate portion of the first one of said brackets or when selected said brackets have the third plate portion thereof secured to one end of an extension plate in turn secured to the front surface of a construction stud and fasteners are installed to perfect the securement and an electric outlet box is positioned adjacent the inner side of each said fourth plate portion of each said bracket in position with respect thereto so that the interior of each said respective electric outlet box is accessible through the respective said fourth plate portion opening adjacent thereto and a dry wall ring is fixed to the other side of said fourth plate portion, said first plate portions tend to stiffen said brackets and said slots enable each said outlet box, bracket and dry wall ring to be held in operative position with screws passed through said slots and secured in said tab-threaded holes with said tabs being oriented to mate with selected edges surrounding the respective said opening adjacent the respective said box and whereby the outer surface of the flange of each said ring is maintained when said screws are tightened in substantially the same plane as the outer surface of the respective said second and third plate portions of the respective said brackets on which each respective said ring is mounted.

13. A plural electrical outlet box mounting assembly as claimed in claim 12 wherein the width of each said respective third plate portion is substantially equal to the width of the stud surface to which said third plate portions are secured thereby enabling the use of common fasteners therethrough with said third plate portions in overlapping relation and said pair of brackets extending in opposite direction.

14. A plural electrical outlet box mounting assembly as claimed in claim 12 wherein the width of each said respective third plate portion is substantially equal to one-half the width of the stud surface to which said third plate portions are secured thereby enabling said third plate portions to be secured in abutting relation with said pair of brackets extending in opposite directions.

15. A plural electrical outlet box mounting assembly as claimed in claim 12 wherein at least one said bracket has the second plate portion thereof formed with a pair of holes for receiving fasteners securing the third plate portion of another said bracket thereto in piggyback relation.

16. A plural electrical outlet box mounting assembly as claimed in claim 12 including at least one rectangular extension plate formed of a single piece of flat stiff sheet material with a stiffening arm at one end in right angular relation and having a plurality of sets of pairs of holes spaced lengthwise thereof located and adapted for receiving fasteners to secure said plate to either the front surface of a said stud or to a respective said bracket third plate portion.

17. A plural electrical outlet box mounting assembly as claimed in claim 12 wherein each said bracket is formed of sheet metal and includes inwardly turned stiffening edges surrounding the fourth plate portion thereof.

18. A plural electrical outlet box mounting assembly, comprising:

(a) a pair of square outlet boxes each having integrally joined base and sidewalls formed with a selected number and size of knock-out discs and on the outer edge of each sidewall of one opposed pair of said sidewalls having at least one inwardly-directed, laterally-spaced screw receiving tab with a threaded hole and positioned to provide at least one pair of diagonally opposite said tabs overlying an interior chamber formed by said box;

(b) a pair of dry wall rings each having a central opening and a peripheral plate flange with screw clearance openings arranged for being mated to said tab threaded holes;

(c) a pair of mounting brackets, each said bracket comprising an L-shaped unitary mounting bracket formed of a single piece of stiff sheet material, including for each said bracket:

(i) first and second contiguous rectangular plate portions in right angular relation at a first end of said bracket, said first plate portion being sufficiently wide to substantially equal the width of the interior space of the wall on which said bracket is installed to thereby serve as a stiffening member for said bracket; and (ii) a plate body portion extending outwardly from said second plate portion having:

(aa) at an outer end a third rectangular flat plate end portion in the same plane as the plane of said second plate portion, said third plate end portion being adapted for securement to a selected support such as the front surface of a construction stud, the second plate portion of another bracket in piggyback relation, or one end surface of an extension plate and having a pair of holes formed therein for receiving a mating pair of fasteners to effect said securement;

(bb) between said third plate portion and second plate portion having a fourth rectangular plate portion in a plane offset from and substantially parallel to the plane of said second and third plate portions by an amount substantially equal to the thickness of a said dry wall ring flange, said fourth plate portion plane being established by parallel offsets formed on both sides of said fourth plate portion;

(cc) an opening in said fourth plate portion defined by opposed straight parallel upper and lower and opposed straight parallel right and left side edges and corner edges formed in said fourth plate portion around said opening, said right and left edges being parallel to said offsets and said opening being sized to register with the interior chamber of said box with the width of said opening being substantially equal to the spacing between a tab on one of said sidewalls and the opposite tab on another of said sidewalls;

(dd) a first pair of laterally spaced screw slots matable with said tabs located adjacent a selected straight edge of said fourth plate portion opening;

(ee) a second pair of laterally spaced screw slots matable with said tabs extending from a second selected straight edge of said fourth plate portion opening opposite said first selected edge of said fourth plate portion opening, said second pair of slots having a depth at least equal to the depth of said first pair of slots for at least limited box mounting adjustment on said bracket in the direction in which said slots are oriented and being positioned opposite to said first pair of slots;

(ff) a flange ring turning surface established by the spacing of said right and left edges of said opening from the said respective offsets on either side thereof and formed such that when a selected screw clearance opening on said dry wall ring rotates around a screw installed in a selected one of said tab threaded holes as another diagonally opposite selected said screw clearance opening is positioned to engage another diagonally opposite screw in another diagonally opposite said tab threaded hole, the bottom surface of said dry wall ring is able to slide on said fourth plate portion; and (d) a plurality of screws adapted for being loosely fitted in said slots and for being secured in said tab threaded holes, whereby when a pair of said brackets extending in opposite directions have the third plate portions thereof secured to the front surface of a construction stud or when a first one of said brackets has the third plate portion thereof secured to the front surface of a construction stud and the second one of said brackets has its third plate portion secured in a piggyback orientation to the second plate portion of the first one of said brackets or when selected said brackets have the third plate portion thereof secured to one end of an extension plate in turn secured to the front surface of a construction stud and fasteners are installed to perfect the securement and an electric outlet box is positioned adjacent the inner side of each said fourth plate portion of each said bracket in position with respect thereto so that the interior of each said respective electric outlet box is accessible through the respective said fourth plate portion opening adjacent thereto and a dry wall ring is fixed to the other side of said fourth plate portion, said first plate portions tend to stiffen said brackets and said slots enable each said outlet box, bracket and dry wall ring to be held in operative position with screws passed through said slots and secured in said tab-threaded holes with said tabs being oriented to mate with selected edges surrounding the respective said opening adjacent the respective said box and whereby the outer surface of the flange of each said ring is maintained when said screws are tightened in substantially the same plane as the outer surface of the respective said second and third plate portions of the respective said brackets on which each respective said ring is mounted.

19. A plural electrical outlet box mounting assembly as claimed in claim 18 wherein the width of each said respective third plate portion is substantially equal to the width of the stud surface to which said third plate portions are secured thereby enabling the use of common fasteners therethrough with said third plate portions in overlapping relation and said pair of brackets extending in opposite direction.

20. A plural electrical outlet box mounting assembly as claimed in claim 18 wherein the width of each said respective third plate portion is substantially equal to one-half the width of the stud surface to which said third plate portions are secured thereby enabling said third plate portions to be secured in abutting relation with said pair of brackets extending in opposite directions.

21. A plural electrical outlet box mounting assembly as claimed in claim 18 wherein at least one said bracket has the second plate portion thereof formed with a pair of holes for receiving fasteners securing the third plate portion of another said bracket thereto in piggyback relation.

22. A plural electrical outlet box mounting assembly as claimed in claim 18 including at least one rectangular extension plate formed of a single piece of flat stiff sheet material with a stiffening arm at one end in right angular relation and having a plurality of sets of pairs of holes spaced lengthwise thereof located and adapted for receiving fasteners to secure said plate to either the front surface of a said stud or to a respective said bracket third plate portion.

23. A plural electrical outlet box mounting assembly as claimed in claim 18 wherein each said bracket is formed of sheet metal and includes inwardly turned stiffening edges surrounding the fourth plate portion thereof.

* * * * *